United States Patent [19]

Drent

[11] Patent Number: 4,835,250

[45] Date of Patent: May 30, 1989

[54] CATALYTIC PREPARATION OF POLYKETONE FROM CARBON MONOXIDE AND OLEFIN

[75] Inventor: Eit Drent, Amsterdam, Netherlands

[73] Assignee: Shell Oil Company, Houston, Tex.

[21] Appl. No.: 908,899

[22] Filed: Sep. 18, 1986

Related U.S. Application Data

[63] Continuation of Ser. No. 596,788, Apr. 4, 1984, abandoned.

[30] Foreign Application Priority Data

Apr. 6, 1983 [NL] Netherlands .......................... 8301213

[51] Int. Cl.$^4$ .............................................. C08G 67/02
[52] U.S. Cl. ...................................................... 528/392
[58] Field of Search .......................................... 528/392

[56] References Cited

U.S. PATENT DOCUMENTS

| | | | |
|---|---|---|---|
| 3,448,140 | 6/1969 | Gamlen et al. | 260/471 |
| 3,689,460 | 9/1972 | Nozaki | 528/392 |
| 3,694,412 | 9/1972 | Nozaki | 528/392 |
| 3,835,123 | 9/1974 | Nozaki | 260/94.9 |
| 3,914,391 | 10/1975 | Nozaki | 423/364 |
| 3,984,388 | 10/1976 | Shryne et al. | 528/392 |
| 4,076,911 | 2/1978 | Fenton | 528/392 |
| 4,474,978 | 10/1984 | Drent | 560/24 |
| 4,740,625 | 4/1988 | Drent | 528/392 |

FOREIGN PATENT DOCUMENTS

| | | |
|---|---|---|
| 2046968 | 11/1964 | Japan . |
| 49-48406 | 12/1974 | Japan . |
| 1081304 | 8/1967 | United Kingdom . |
| 2058074 | 4/1981 | United Kingdom . |

OTHER PUBLICATIONS

Organometallics 1984, 3, 866–870.
Proc. Ind. Assoc. Cult. Sci. 1985, 68B, 1–5.
Chemtech 1986, 1, 48–51.
Adv. Polym. Sci. 1986, 73–4, 125–44.
Polym. Lett. 1965, 3, 703–7.
Chim. Ind. 1971, 53, 939–40.
J. Mol. Catal. 1983, 18, 117–25.
J. Organomet. Chem. 1985, 279, C5–C10.
Tetrahedron Lett. 1971, 26, 2409–2412.

*Primary Examiner*—Harold D. Anderson
*Attorney, Agent, or Firm*—Dean F. Vance

[57] ABSTRACT

Copolymers of ethylene and CO(polyketones) are produced by copolymerization in the presence of a catalyst comprising palladium, cobalt or nickel, a bidentate phosphine ligand and a non-coordinating anion, e.g., derived from p-toluene sulfonic acid.

13 Claims, No Drawings

CATALYTIC PREPARATION OF POLYKETONE FROM CARBON MONOXIDE AND OLEFIN

This is a continuation of application Ser. No. 596,788, filed Apr. 4, 1984, now abandoned.

FIELD OF THE INVENTION

The invention relates to a process for the preparation of polyketones by polymerizing a mixture of CO and an alkenically unsaturated hydrocarbon in the presence of a Group VIII metal catalyst containing ligands, in which hydrocarbon groups occur that are bonded to an element from group Vb.

BACKGROUND OF THE INVENTION

A process for preparing polyketones from carbon monoxide and ethylene is disclosed in U.S. Pat. Nos. 3,689,460 and 3,694,412. The catalysts described therein are complexes of a palladium chloride or $\pi$-allylpalladium chloride and two trihydrocarbylphosphine monodentate ligands, e.g., triphenylphosphine. However, the polymer yields remain relatively small, viz. less than 35 g/g Pd/hour at a pressure of 70 bar. Another process for preparing polyketones is discussed by Sen and Lai in the article entitled "Novel Palladium (II)-Catalyzed Copolymerization of Carbon Monoxide with Olefins", J. Am. Chem. Soc. 1982, 104, 3520–3522.

A new process for preparing polyketones in high yields is disclosed.

SUMMARY OF THE INVENTION

The present invention concerns a process for the preparation of polyketones by polymerizing a mixture of CO and an alkenically unsaturated hydrocarbon in the presence of a Group VIII metal catalyst containing ligands, in which hydrocarbon groups occur that are bonded to an element from group Vb, characterized in that, as catalyst, a complex compound is used that is obtained by reacting a palladium, cobalt or nickel compound, a bidentate ligand of the general formula $R^1R^2-M-R-M-R^3R^4$, in which M represents phosphorus, arsenic or antimony, $R^1$, $R^2$, $R^3$ and $R^4$ are identical or different hydrocarbon groups, and R represents a divalent organic bridging group having at least two carbon atoms in the bridge, none of these carbon atoms carrying substituents that may cause steric hindrance, and an anion of an acid with a pKa of less than 2, provided said acid is neither a hydrohalogenic acid nor a carboxylic acid.

DETAILED DESCRIPTION OF THE INVENTION

The anions used in the process according to the invention are preferably non-coordinating anions, by which is meant that little or no covalent interaction takes place between the palladium and the anion (cf. GB-A No. 2,058,074). Typical examples of such anions are $PF_6^-$, $SbF_6^-$, $BF_4^-$, and $ClO_4^-$.

Preferred anions are those of, for example, sulfonic acids and acids that can be formed, possibly in situ, by interacting a Lewis acid such as, for example, $BF_3$, $AsF_5$, $SbF_5$, $PF_5$, $TaF_5$ or $NbF_5$ with a Broensted acid such as, for example, a hydrohalogenic acid, in particular HF, fluosulfonic acid, phosphoric acid or sulfuric acid. Specified examples of acids of the latter type are fluosilicic acid, $HBF_4$, $HPF_6$ and $HSbF_6$. Examples of usable sulfonic acids are fluosulfonic acid and chlorosulfonic acid and the hereinafter specified sulfonic acids.

A preferred group of anions are anions of acids having the general formula

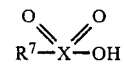

in which X represents sulfur or chlorine and, if X is chlorine, $R^7$ represents oxygen and, if X is sulfur, $R^7$ represents an OH group or an optionally substituted hydrocarbon group.

When the hereinbefore stated acids are used in the process according to the invention, the anions of the acids can be considered to be non-coordinating. The anions are preferably used in the form of the acids themselves, but under certain conditions it is also possible to use them in the form of salts, e.g., $AgBF_4$, $AgSBF_6$ or Ag-p-toluene sulfonate. The point is that it must be possible for the anion of the Group VIII metal compound to be exchanged with the anion of the salt.

In the acids having the general formula I, the optionally substituted hydrocarbon group represented by $R^7$ is preferably an alkyl, aryl, aralkyl or alkaryl group having 1–30, in particular 1–14, carbon atoms. The hydrocarbon group may, for example, be substituted with the halogen atoms, in particular fluorine atoms. Examples of suitable acids of the general formula I are perchloric acid, sulfuric acid, 2-hydroxypropane-2-sulfonic acid, p-toluene sulfonic acid and trifluoromethanesulfonic acid, the last two acids being the most preferred. The acid of the general formula I can also be an ion exchanger containing sulfonic acid groups, such as, for example, Amberlite 252 H. In that case, the hydrocarbon group $R^7$ is a polymeric hydrocarbon group substituted with sulfonic acid groups, for example a polystyrene group.

The anion of the acid with a pKa<2 is preferably present in the reaction mixture in a quantity of 0.01–150, in particular 0.1–100 and most preferably of all 1–50 equivalents per gram atom Group VIII metal. It is to be noted that the aforesaid pKa is measured in aqueous solution at 18° C.

The alkenically unsaturated hydrocarbon will as a rule be an alkene or cycloalkene with 2–30, preferably 2–12 carbon atoms. Examples of suitable alkenes are propylene, butene-1, butene-2, isobutylene, the isomeric pentenes, hexenes, octenes and dodecenes, cyclo-octene and cyclododecene. Ethylene is most preferred. Examples of other alkenically unsaturated hydrocarbons are styrene, alpha-methylstyrene, and dialkenes in which the two unsaturated groups are not conjugated.

Of the palladium, nickel or cobalt compounds, the first are preferred and the process according to the invention is hereinafter described in further detail in respect of palladium compounds. This may, however, not be regarded as limiting; the use of cobalt or nickel compounds remains equally possible.

Both homogeneous and heterogeneous palladium compounds can be used. Homogeneous systems are preferred. Suitable palladium compounds are salts of palladium with, for example, nitric acid, sulfuric acid or alkane carboxylic acids having not more than 12 carbon atoms. Salts of hydrohalogenic acids are theoretically also usable, but have the drawback that the halogen ion may have a corrosive action. Palladium carboxylates are the catalyst compounds preferably used, in particular palladium acetate. In addition, palladium acetylacetonate can also be used. Palladium on carbon and palladium bonded to an ion exchanger, for example one containing sulfonic acid groups, are examples of suitable heterogeneous palladium compounds.

The quantity of palladium compound is not critical. Preferably, quantities between $10^{-8}$ and $10^{-1}$ mol palladium compound per mol hydrocarbon to be polymerized are used. The molar ratio of alkenically unsaturated hydrocarbon to CO will as a rule range from 5:95 to 95:5, preferably from 1:5 to 5:1.

Where, in the bidentate ligand, it is said that substituents offering steric hindrance should be absent, this means that no substituents may be present that are able to hinder the formation of complex compounds having the general formula II

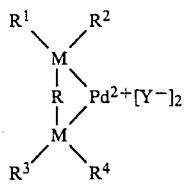

In that formula, Y represents a non-coordinating anion, while $Pd^{2+}$ can also be written as

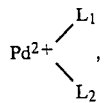

in which the ligands $L_1$ and $L_2$ are weakly coordinated solvent ligands, e.g. acetonitril, methanol, acetone, or acetylacetone, or correspond with those employed in the palladium compounds described in the preceding paragraph.

In the aforesaid ligands, M is preferably phosphorus. Hydrocarbon groups $R^1$, $R^2$, $R^3$ and $R^4$ will as a rule contain 2 to 18 carbon atoms, preferably 6 to 14 carbon atoms. Aryl groups are the most suitable, in particular the phenyl group. Preferred bridging groups —R— are those having the formula $(CR^5R^6)_n$ in which $R^5$ and $R^6$ are hydrogen atoms or hydrocarbon groups offering no steric hindrance and n is a number of at least two, most preferably 2, 3 or 4. Substituents $R^5$ and $R^6$ are preferably hydrogen atoms. The bridging groups R may also make part of a cyclic structure, e.g. an aromatic or cycloaliphatic group, the carbon to carbon bond or bonds in the bridge may be saturated or unsaturated and in the bridge or in the cyclic or non-cyclic groups attached to the bridge one or more hetero atoms, e.g. sulfur, oxygen, iron or nitrogen, may have been substituted for carbon atoms, other than the two carbon atoms which must be present in the bridge linking both atoms M.

Examples of suitable bidentate ligands are
1,3-di(diphenylphosphine)propane,
1,4-di(diphenylphosphine)butane,
2,3-dimethyl-1,4-di(diphenylphosphine)butane,
1,5-di(methyl-phenyl-phosphine)pentane,
1,4-di(dicyclohexylphosphine)butane,
1,5-di(dinaphthylphosphine)pentane,
1,3-di(di-p-tolylphosphine)propane,
1,4-di(di-p-methoxyphenylphosphine)butane,
1,2-di(diphenylphosphine)ethene,
2,3-di(diphenylphosphine)butene-2,
1,3-di(diphenylphosphine)-2-oxapropane,
2-methyl,2-(methyldiphenylphosphine)-1,3-di(diphenylphosphine)propane,
O,O'-di(diphenylphosphine)biphenyl,
1,2-di(diphenylphosphine)benzene,
2,3-di(diphenylphosphine)naphthalene,
1,2-di(diphenylphosphine)cyclohexane,
2,2-dimethyl-4,5-di(diphenylphosphine)dioxolane and

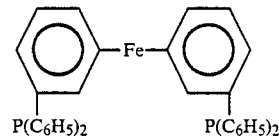

The bidentate ligand can be used in quantities, relative to the palladium compound, that can range within wide limits, e.g., from 0.1 to 10 mol per mol palladium compound. Preferred quantities range from 0.33 to 3 mol per mol. If cobalt or nickel compounds are used, the quantity used is generally somewhat higher, preferred quantities then ranging from 5 to 20 mol per mol Group VIII metal compound.

In addition to the bidentate ligand, one or more monodentate ligands can also be used in the preparation of the catalysts in order to influence the molecular weight of the polymer to be prepared. Suitable monodentate ligands are in particular triarylphosphines, such as triphenylphosphine and trinaphthylphosphine. The use of an excess of monodentate ligand in relation to the Group VIII metal compound is recommended. Preferred quantities range from 10:1 to 60:1 in relating to the Group VIII metal compound.

The carbon monoxide can be used in pure form or diluted with an inert gas such as nitrogen, noble gases or carbon dioxide in the process according to the invention. The presence of more than 60%v hydrogen is generally undesirable because too great a reduction of the molecular weight of the desired polymer may then occur.

Polymerization according to the invention is preferably performed at a temperature between 20° and 200° C., in particular between 50° and 150° C. The total pressure ranges between preferably 1 and 100, in particular 20 and 75, bar gauge.

Polymerization according to the invention can be performed batchwise, continuously or semi-continuously according to solution polymerization or suspension polymerization methods. Use of a liquid diluent is generally desirable. Lower alcohols, ethers, glycols and glycoethers have proved suitable. The polymers obtained are genuine co-polymers which are generally characterized by the formula

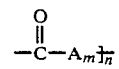

wherein m is a relatively small number, for example 1 to 6, A is the "monomer" unit which is converted into a saturated hydrocarbon group and n a number of 2, 3 or more preferably more than 10, e.g., 3000, 6000.

Instead of one "monomer" A, there may also be two different "monomers", e.g., ethylene and styrene, ethylene and acrylic acid, ethylene and vinyl acetate, ethylene and butylene-1, propylene and methyl metacrylate, butene-1 and acrylic acid, etc. As terminal groups of the polymer, the following groups, among others, can be obtained: —CH$_2$—CH$_3$,

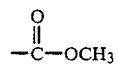

if CH$_3$OH is used as diluent and

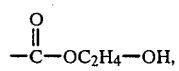

if ethylene glycol is used;

if water is used and

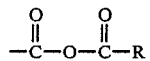

if carboxylic acids are used. The activity of the catalysts can be so high that catalyst residues need not be removed from the copolymer obtained. This eliminates the need to purify the copolymer and/or recover palladium, which signifies a major economic advantage.

The process according to the invention is hereinafter illustrated on the basis of practical examples.

EXAMPLES

A magnetically stirred 250-ml autoclave was charged with 50 ml methanol, 0.1 mmol palladium acetate, 0.15 mmol 1,3-di(diphenylphosphine)propane and 2 mmol p-toluene sulfonic acid. The autoclave was flushed with CO, filled with ethylene at a pressure of 20 bar and CO at a pressure of 30 bar, sealed and heated at a certain temperature for a cetain period of time. On completion the polymer yield was determined and calculated in grams polymer per gram palladium per hour. NMR analysis was also performed to determine the terminal groups present and the mean molecular weight. The results of this experiment (test 1) are stated in Table I.

For comparison, tests 1a and 1b were performed. In test 1a a catalytic system was used which was obtained by reacting 0.1 mmol palladium acetate, 3 mmol triphenylphosphine (a monodentate ligand) and 2 mmol p-toluene sulfonic acid. The catalytic system of test 1b was obtained by reacting 0.1 mmol palladium acetate and 0.15 mmol 1,3-di(diphenylphosphine)propane, but no p-toluene sulfonic acid.

For further comparison tests 1c and 1d were carried out. In tests 1c, as acid 2 mmol H$_3$PO$_4$ were used instead of p-toluene sulfonic acid and in test 1d the acid was 2 mmol HCl.

In test 2, 1,4-di(diphenylphosphine)butane was used to prepare the catalytic system instead of the propane derivate. Other different conditions are stated in Table I, for the rest the conditions remained unchanged in test 1.

In test 3 the same catalyst was used as in test 1. However, the autoclave was filled with CO at 30 bar, ethylene at 20 bar and hydrogen at 10 bar.

In test 4, test 1 was repeated using 50 ml diglyme instead of methanol.

In test 5, 2 mmol HBF$_4$ were used instead of p-toluene sulfonic acid.

In test 6, test 1 was repeated with 3 mmol triphenylphosphine also present.

In test 7, the catalytic system of test 2 was used again with diethylene glycol being used as reaction medium.

In test 8, the catalytic system of test 1 was used; the reaction medium was now 1,4-butanediol and the partial pressures amounted to 40 bar CO and 10 bar ethylene.

In test 9, test 1 was repeated, except for the use of ethylene glycol as reaction medium, under the conditions stated in Table I.

In test 10, test 2 was repeated with ethylene glycol used as reaction medium.

In tests 11–15, a complex was used that was obtained by first performing the reaction PdCl$_2$+AgBF$_4$→PD(BF$_4$)$_2$+AgCl and then reacting 0.5 mmol (Pd(BF$_4$)$_2$ with 0.5 mmol 1,3-di(diphenylphosphine)propane in acetonitrile as solvent. In tests 12 and 14 the complex was used without added acid, in tests 11, 13 and 15, 2 mmol HBF$_4$ were added to 0.1 mmol of the complex.

In tests 11 and 12, 50 ml methanol were used as reaction medium, in test 13, 50 ml ethylene glycol and in tests 14 and 15, 50 ml diglyme. Partial pressures were 30 bar CO and 20 bar ethylene glycol in tests 11, 12 and 13, and 20 bar CO, 20 bar ethylene and 20 bar hydrogen in tests 14 and 15.

In test 16 the catalyst was obtained by reacting 0.12 mmol nickel acetate, 1.5 mmol 1,3-di(diphenylphosphine)propane and 2 mmol p-toluene sulfonic acid. The reaction medium during polymerization was 50 ml methanol.

In test 17 the catalyst was obtained by reacting 0.12 mmol cobalt acetate, 1.5 mmol 1,4-di(diphenylphosphine)butane and 2 mmol p-toluene sulfonic acid. In this case too, 50 ml methanol were used as reaction medium.

TABLE I

| Test | T(°C.) | Time (hours) | Yield g/g/h | $(MW)_n$ | Terminal groups (%) |
|---|---|---|---|---|---|
| 1 | 135 | 0.25 | 3000 | 2600 | A(71), B(29) |
| 1a | 135 | 0.25 | —* | — | — |
| 1b | 135 | 15 | —* | — | — |
| 1c | 135 | 5 | 10 | — | — |
| 1d | 135 | 5 | 10 | — | — |
| 2 | 110 | 0.16 | 4800 | 1800 | A(49), B(51) |
| 3 | 135 | 0.16 | 6000 | 1499 | A(92), B(8) |
| 4 | 135 | 1.5 | 700 | 2000 | A(100) |
| 5 | 110 | 0.25 | 5000 | — | — |
| 6 | 135 | 1 | 1000 | 250 | A(50), B(50) |
| 7 | 120 | 5 | 1200 | 2000 | A(100), (i) |
| 8 | 115 | 5 | 650 | 1500 | A(99), (ii) |
| 9 | 115 | 5 | 500 | 2150 | A(88), C(12) |
| 10 | 80 | 5 | 200 | 15000 | A(100) |
| 11 | 100 | 5 | 600 | 7500 | A(62), B(38) |
| 12 | 100 | 5 | 300 | 860 | A(56), B(44) |
| 13 | 110 | 5 | 250 | 3050 | A(75), C(25) |
| 14 | 85 | 5 | 100 | 30000 | A(100) |
| 15 | 70 | 5 | 200 | 30000 | A(100) |
| 16 | 135 | 5 | 100** | 150 | A(83), B(17) |

TABLE I-continued

| Test | T(°C.) | Time (hours) | Yield g/g/h | $\overline{(MW)}_n$ | Terminal groups (%) |
|---|---|---|---|---|---|
| 17 | 135 | 5 | 60*** | — | — |

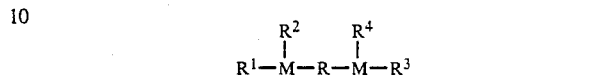

(i) also present in chain: groups $$-\overset{O}{\underset{\|}{C}}-O-C_2H_4-O-C_2H_4-O-\overset{O}{\underset{\|}{C}}-$$

(ii) also present in chain: groups $$-\overset{O}{\underset{\|}{C}}-O-C_4H_8Y-O-\overset{O}{\underset{\|}{C}}-$$

*yield: no polymer but soley $C_2H_5-\overset{O}{\underset{\|}{C}}-OCH_3$
**g/g Ni/h
***g/g Co/h

EXAMPLE II

Palladiumchloride and the silver salt of p.toluenesulphonic acid were reacted in acetonitrile solvent to form a complex compound corresponding with the formula $Pd(CH_3-CN)_2(O_3S-C_6H_4-CH_3)_2$.

0.1 mmol of this complex were combined with various bidentate phosphine ligands, each time employing 0.1 mmol phosphine per 0.1 mmol of bidentate ligand.

Ethylene and CO were copolymerized at 84° C., 45 bar total pressure and a palladium concentration of 0.1 milliat. in 150 ml methanol. The volumetric feed ratio of CO to ethylene was 1:1, this corresponds with a gas cap ratio of 2:1 (CO:$C_2H_4$).

The ligands employed were:
run 18: 1,2-di(diphenylphosphine)ethane
run 19: 1,3-di(diphenylphosphine)propane
run 20: 1,4-di(diphenylphosphine)butane
run 21: 1,2-di(diphenylphosphine)benzene
run 22: 2-methyl,2-(methyldiphenylphosphine)-1,3-di(diphenylphosphine)propane.

The latter compound, i.e. $CH_3-C-(CH_2-P(C_6H_5)_2)_3$, although being trifunctional, is nevertheless considered a bidentate ligand in the terms of this invention since only two of the three phosphorus atoms can coordinate with the palladium atom in the complex compound.

The results of the polymerization runs are illustrated in Table II.

TABLE II

| Run | Time (hours) | Yield g/g/h |
|---|---|---|
| 18 | 3.1 | 106 |
| 19 | 1.1 | 1657 |
| 20 | 3.0 | 570 |
| 21 | 1.75 | 544 |
| 22 | 3.0 | 2412 |

What is claimed is:

1. In a process for the preparation of a polyketone by contacting a mixture of CO and an alkenically unsaturated hydrocarbon with a catalyst the improvement which comprises contacting the CO and the alkenically unsaturated hydrocarbon in the presence of a catalyst comprising a Group VIII metal complex containing bidentate ligands, the Group VIII metal selected from the group consisting of palladium, cobalt, and nickel, the ligands comprising hydrocarbon groups bonded to a Group Va element selected from the group consisting of phosphorus, arsenic, and antimony, wherein the catalyst is a complex compound that is obtained by reacting (1) a palladium, cobalt or nickel compound, (2) a bidentate ligand of the general formula $$R^1-\underset{\underset{R^2}{|}}{M}-R-\underset{\underset{R^4}{|}}{M}-R^3$$

in which M is a Group Va element selected from the group consisting of phosphorus, arsenic, and antimony, $R^1$, $R^2$, $R^3$, and $R^4$ are identical or different hydrocarbon groups, R represents a divalent organic bridging group having at least two carbon atoms in the bridge, wherein the carbon atoms of the bridging group R do not contain substituents that would sterically hinder formation of the complex compound, and (3) an anion of an acid with a pKa of less than 2, provided said acid is neither a hydrohalogenic acid nor carboxylic acid.

2. The process according to claim 1 wherein the anion is a non-coordinating anion.

3. The process according to claim 2 wherein the anion is an anion of sulfuric acid or an acid formed by interacting a Lewis acid with a Broensted acid.

4. The process according to claim 1 wherein the anion is an anion of an acid having the general formula

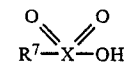

in which X represents sulfur or chlorine and, when X is chlorine, $R^7$ represents oxygen and, when X is sulfur, $R^7$ represents an OH group or hydrocarbon group.

5. The process according to claim 4 wherein X is sulfur and the hydrocarbon group $R^7$ is an alkyl, aryl, aralkyl or alkaryl group having 1–30 carbon atoms.

6. The process according to claim 4 wherein the anion is an anion of p-toluene sulfonic acid of trifluromethanesulfonic acid.

7. The process according to claim 1 wherein the hydrocarbon groups $R^1$, $R^2$, $R^3$ and $R^4$ are aryl groups having 6–14 carbon atoms.

8. The process according to claim 7 wherein the aryl groups are phenyl groups.

9. The process according to claim 1 wherein the mol ratio of bidentate ligand to Group VIII metal compound selected from the group consisting of compounds of palladium, nickel and cobalt is 0.1:10 mol bidentate ligand per mol metal compound.

10. The process according to claim 1 wherein (1) is a palladium compound.

11. The process according to claim 1 wherein the bidentate ligand is a phosphine.

12. The process according to claim 1 in which group —R— represents a group —$(CR^5R^6)_n$— in which n is a number of at least 2 and $R^5$ and $R^6$ are hydrogen atoms or hydrocarbon groups that will not sterically hinder formation of the complex compound.

13. The process according to claim 1 wherein the alkenically unsaturated hydrocarbon is ethylene.

* * * * *